Figure 1:
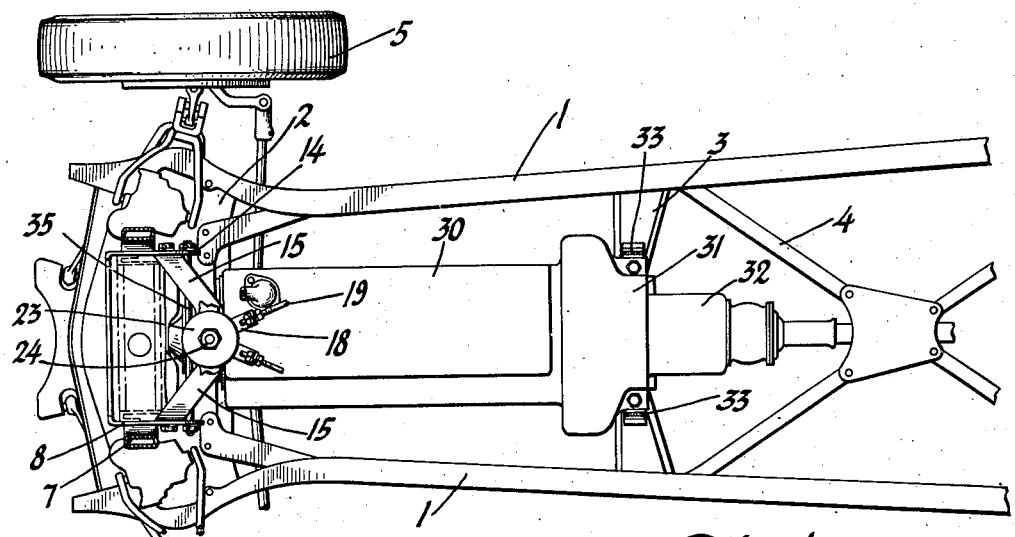

Nov. 26, 1935.    J. F. WOLFRAM ET AL    2,022,099
ENGINE MOUNTING
Filed Jan. 5, 1935    2 Sheets-Sheet 2
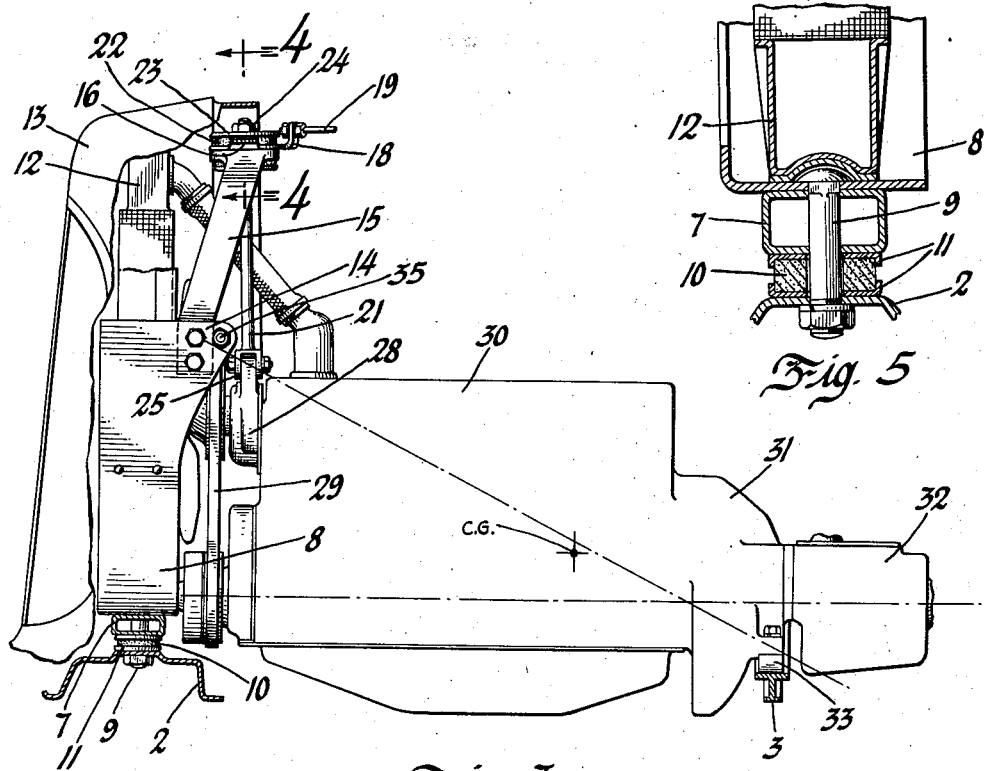
Fig. 3
Fig. 5
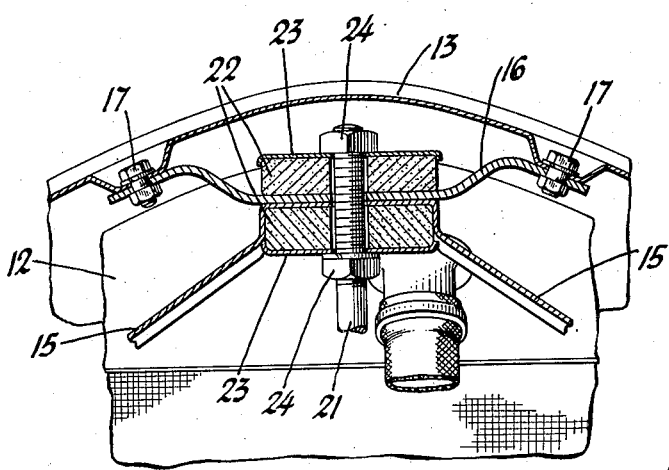
Fig. 4
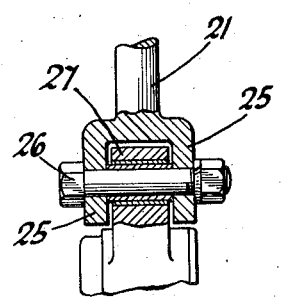
Fig. 6
Inventors
Jack F. Wolfram &
Howard S. Cuttier
By Blackmore, Spencer & Flint
Attorneys Patented Nov. 26, 1935

2,022,099

UNITED STATES PATENT OFFICE 2,022,099

ENGINE MOUNTING

Jack F. Wolfram and Howard S. Currier, Lansing, Mich., assignors to General Motors Corporation, Detroit, Mich., a corporation of Delaware Application January 5, 1935, Serial No. 508

10 Claims. (Cl. 180—64)

This invention relates to the front end construction of motor vehicles and particularly to an improved mounting arrangement of the various forwardly positioned units.

Conventional motor vehicles involve a chassis or main frame supported upon road wheels to carry forwardly of the body an internal combustion engine, an engine cooling radiator and wheel feeders or mud guards. When such units are fastened more or less immovably in the frame, not only is engine vibration transmitted throughout the whole of the vehicle, but also the effects of frame weaving are imposed upon the various associated parts and in addition the moment of inertia of the front end is increased and its natural period of vibration is low enough that under certain operating conditions within the ordinary speed range a violent shaking or road reaction occurs.

To free the parts from damaging strains by reducing disturbing forces, and to render their effects less noticeable, are among the aims of the present invention. Accordingly, it is proposed in a specific embodiment, to brace the upper portion of the radiator structure and hold it substantially immovable relative to the vehicle body and to mount it, together with the supporting brackets for the front of the fenders, through a cushion connection on the frame which allows movement of the frame when twisted without moving and straining the radiator and fenders, and further to divorce the engine from the front of the frame and suspend it instead from the braced upper portion of the radiator structure preferably through vibration insulating joints.

The suspension of the engine from the radiator enables the engine connection to be placed at a convenient point out of interference with the usual accessory drive means at the front of the engine and substantially in line with the engine center of gravity and the rear engine mounting. This makes for greater stability and affords an axis of oscillation which approximates the natural axis about which the engine tends to vibrate under conditions of high torque load. It also conserves space and provides a compact assembly. The arrangement as a whole changes the moment of inertia of the frame so that its natural period of vibration is high and beyond the range of road reaction whereby front end shake incident to travel is eliminated.

Because both the chassis frame and the engine have a certain freedom of movement relative to the fenders and radiator structure, and because the radiator structure, the fenders, and the engine hood are held substantially fixedly with reference to the vehicle body, the vehicle occupant has no perception of any ordinary relative movement taking place, but enjoys the delightful sensation of smooth operation with a feeling of security and an absence of nervous fatigue.

Figure 2:
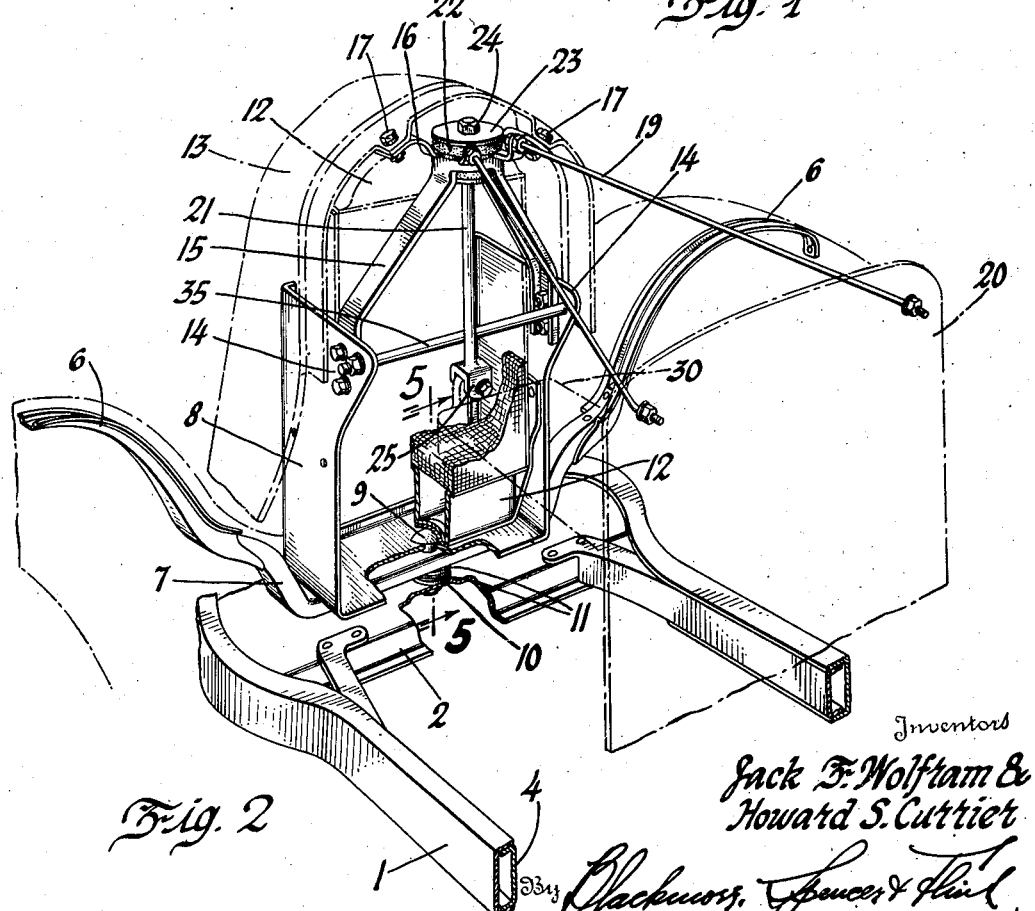

The invention will be understood best from an inspection of the accompanying drawings, wherein Figure 1 is a top plan view of the front portion of a motor vehicle chassis, with the engine and radiator structure mounted therein; Figure 2 is a perspective view, with parts in section, viewed at an angle to the rear of the radiator; Figure 3 is a side elevation illustrating the mounting of the engine; Figure 4 is a detail sectional view taken on line 4—4 of Figure 3; Figure 5 is a detail sectional view taken on line 5—5 of Figure 2, and Figure 6 is a detail sectional view of the pivotal joint supporting the front of the engine.

The chassis frame shown in the drawings involves a pair of longitudinally extending members 1—1, having a transverse plate-like connection 2 at the front and an intermediate transverse member 3 together with stiffening bars 4 nested within the main frame members 1 and connected at their forward ends with the front cross member and projected toward each other beyond the intermediate cross member 3 to provide a substantially X-shaped central reinforcement. Only the forward portion of the chassis frame is illustrated, and this may be supported upon the road wheels 5 through a suitable spring suspension system. The suspension system for example may be like that shown in "Motor", Volume 61, page 53, April 1934, wherein each wheel is independently sprung by being connected with the chassis through a pair of vertically spaced links with a coil spring interposed between the lowermost link and the underside of the chassis.

Superposed above the front frame member 2 and joined therewith by a suitable resilient connection is the radiator and fender supporting structure. In the drawings the fender supporting brackets 6, which extend outwardly over the wheels, are joined to the opposite ends of a transversely disposed box section bar 7 above which is positioned an upwardly projecting U-shaped framing member 8. A fastening bolt 9 extends downwardly through the members 8 and 7 and joins them to the frame cross member 2 and, as illustrated particularly in the detail view, Figure 5, a pad 10 of rubber or other similar material, preferably vulcanized between a pair of wear plates 11, is secured by the bolt 9 between the frame and the fender and radiator supporting structure. This resilient pad supports the weight of the parts and serves to cushion some of the forces which otherwise would be transmitted through the joint but more particularly because of its elasticity, it accommodates relative movement, especially that occurring when the side frame members are twisted or raised one above the other due to ground irregularities.

Supported within the cradle or U-shaped member 8 is the radiator assembly 12 which forms a part of the engine cooling system and is connected with the engine jacket for the flow of cooling medium in the usual fashion, and the whole is enclosed within an ornamental housing or radiator shell 13. Each leg of the U-shaped member 8 is provided near its top with a rearwardly extending ear 14 for mounting the ends of an inverted V-shaped framing member 15 extending upwardly and joining in suitable fashion with an anchor plate 16 secured by bolts 17 to the top of the radiator shell. The bracket 16 is provided with a pair of rearwardly extending ears 18 for the attachment of the forward ends of a pair of diagonally disposed brace rods 19 that diverge rearwardly for connection with the vehicle body dash board 20. By reason of the brace rods 19 it will be readily apparent that the upper portion of the radiator structure will be located with reference to the rearwardly spaced vehicle body and held substantially immovable relative thereto.

For supporting the front of the engine from the radiator structure use is made of a suspension rod 21 extending downwardly from the upper portion of the radiator frame to the upper part of the engine located behind the radiator. To incorporate a cushion in the front mounting, a pair of rubber pads 22 may be used in the connection between the upper end of the rod 21 and the inverted V member 15. These pads are positioned on opposite sides of the member 15 and are provided with bearing plates 23, with which engage fastening nuts 24 threaded on the rod. The opposite end of the rod is preferably pivotally connected with the engine, and for this purpose it is shown forked to provide spaced feet 25 through which extend a pivot bolt 26 for mounting an apertured ear 27 between the feet 25. Bearing sleeves may be interposed between the pivot bolt and the apertured ear or in lieu thereof a rubber joint may be used at this place for the purpose of accommodating relative movement. For convenience the attachment ear 27 is formed on the water pump housing 28 mounted on the front face of the engine cylinder block. A belt 29 drives both the water pump and the radiator fan from the drive pulley on the crankshaft in the usual way.

The power plant is illustrated in the drawings as including an internal combustion engine 30 to which is fastened as a unit the clutch housing 31 and the transmission or change speed gear housing 32. At the transmission end of the unit a connection to the frame member 3 may be provided and this connection preferably will be in the nature of rubber joints 33 of conventional design. By this arrangement of parts a longitudinal line drawn downwardly from the elevated front mounting connection to the rear mounting of the engine will substantially intersect the engine center of mass, although from a practical standpoint, the line should be slightly above the engine center of mass somewhat as illustrated in Figure 3, where the point CG may be taken to indicate the location of the center of gravity and the broken line the axis of suspension. The axis of suspension will be found to substantially coincide with the natural axis about which the engine tends to vibrate when the engine is operated under load.

Because the radiator structure carries a substantial portion of the engine weight it may be considered desirable to connect the ears 14 of the U-shaped frame member by a transverse bar 35 to hold the radiator receiving frame against spreading. At the same time this frame should be made sufficiently heavy to properly support the load and because it is made heavy it affords better protection for the comparatively delicate radiator core construction.

By this arrangement of parts it will be seen readily that there is little likelihood of engine vibration being transmitted through the frame and associated parts and that the engine being divorced from direct attachment to the frame will not be distorted or otherwise affected by the twisting of the chassis frame. Neither will the frame weaving which is, of course, most pronounced at the extreme forward end of the chassis frame throw strains into the radiator and fenders, but is free to occur without carrying with it the radiator and fender structure, because of the flexible connection at the bottom and the rigid brace bars at the upper end.

We claim:

1. In a motor vehicle, a chassis frame, an internal combustion engine having a tendency to vibrate about a longitudinal axis under certain operating conditions, means yieldably mounting the rear of the engine, an engine cooling radiator positioned forward of the engine, means mounting said radiator on the frame and extending upwardly above the engine at the front thereof, and an engine supporting member carried by the upper portion of the radiator mounting means and connected to the engine adjacent said axis to accommodate in cooperation with said rear mounting means, the turning movement of the engine about said axis.

2. A motor vehicle having associated with its frame in longitudinal succession, a radiator assembly, an engine assembly, and a body, a yieldable support for the radiator assembly, bracing structure extending above the engine assembly and connecting the top of the yieldably supported radiator assembly with the body and means yieldably mounting the engine assembly, including a weight carrying member between the engine assembly and the radiator assembly, and means movably joining said member to one of said assemblies.

3. Motor vehicle construction having radiator structure connected for relative movement near its bottom with the vehicle frame and braced at its upper end from the vehicle body with an engine adjacent the radiator, and being characterized by engine mounting means including a weight supporting element connecting the upper portion of the radiator structure and the upper portion of the engine.

4. In combination, an engine, a frame receiving the engine, radiator structure extending above the frame at one end of the engine, means connecting the frame and radiator structure for relative movement, water flow connections between the radiator structure and the engine and engine supporting means constituting the sole support for the front of the engine connecting for relative movement the upper portions of the engine and radiator structure.

5. In combination, an engine having a tendency to oscillatory vibration about a longitudinal axis, a frame receiving the engine, radiator structure forward of the engine and above the frame, means movably mounting the radiator structure on the frame, means movably mounting the rear of the engine on the frame, and means constituting a pivotal joint positioned substantially on said axis, connecting the front of the engine to the radiator structure and cooperating with the rear mounting in supporting the engine for oscillation.

6. A system of engine suspension, including an engine, a frame receiving the engine, a radiator positioned forward of the engine above said frame, a resilient connection between the rear of the engine and the frame, and weight supporting connection for the front of the engine, including a resilient mounting joining the upper portions of the engine and radiator.

7. A motor vehicle having a chassis frame, an engine, radiator structure supported on said frame, and means for supporting the engine on the radiator structure including a downwardly extending weight carrying member pivotally connected with the engine and a cushion connection between said member and radiator structure.

8. In combination, a chassis frame, an engine, a radiator structure supported by said frame, and means supporting the engine on the radiator structure including a dependent member movably connected at opposite ends to the radiator structure and the engine.

9. In a motor vehicle, a main frame, an engine positioned therein, an auxiliary frame positioned above the main frame forward of the engine and adapted to receive therein the engine cooling radiator and to extend upwardly along opposite sides of the radiator, means to suspend the engine from the top of said auxiliary frame, and a tie bar connecting the sides of said frame to resist spreading thereof under the weight of the engine.

10. In a motor vehicle, the combination with a frame, an engine and a body to be mounted on the frame, of harness structure forward of the body and engine and adapted for the support of an engine cooling radiator and the forward portions of a pair of wheel fenders as a unit therewith, a support connection mounting the harness on the frame for movement relative thereto, bracing connections between the upper part of the harness and said body, a resilient mounting between the rear of the engine and the frame and a suspension element depending from said harness and being pivotally joined to the front of the engine on a line substantially intersecting the engine center of gravity and said rear engine mounting.

JACK F. WOLFRAM.
HOWARD S. CURRIER.